United States Patent
Tarpenning et al.

(10) Patent No.: US 6,513,117 B2
(45) Date of Patent: Jan. 28, 2003

(54) CERTIFICATE HANDLING FOR DIGITAL RIGHTS MANAGEMENT SYSTEM

(75) Inventors: Marc Tarpenning, Palo Alto; Ben Kavanah; Brian Slesinsky, both of San Francisco, all of CA (US)

(73) Assignee: Gemstar Development Corporation, Pasadena, CA (US)

( * ) Notice: Subject to any disclaimer, the term of this patent is extended or adjusted under 35 U.S.C. 154(b) by 74 days.

(21) Appl. No.: 09/168,351

(22) Filed: Oct. 7, 1998

(65) Prior Publication Data

US 2002/0007454 A1 Jan. 17, 2002

Related U.S. Application Data (63) Continuation-in-part of application No. 09/034,720, filed on Mar. 4, 1998.

(51) Int. Cl.[7] ............................................. G06F 01/24
(52) U.S. Cl. ...................................... 713/156; 380/252
(58) Field of Search .................... 380/282; 705/51; 713/156

(56) References Cited

U.S. PATENT DOCUMENTS

| | | | | |
|---|---|---|---|---|
| 5,265,164 A | * | 11/1993 | Matyas et al. | 380/30 |
| 5,465,213 A | | 11/1995 | Ross | |
| 5,629,980 A | | 5/1997 | Stefik | |
| 5,734,823 A | | 3/1998 | Saigh | |
| 5,761,306 A | * | 6/1998 | Lewis | 380/21 |
| 5,768,528 A | | 6/1998 | Stumm | |
| 5,883,960 A | * | 3/1999 | Maruyama et al. | 380/23 |
| 5,892,899 A | * | 4/1999 | Aucsmith et al. | 395/186 |
| 5,892,900 A | | 4/1999 | Ginter et al. | |
| 5,907,837 A | | 5/1999 | Ferrel et al. | |
| 5,956,406 A | * | 9/1999 | Maldy | 380/30 |
| 5,970,147 A | * | 10/1999 | Davis | 380/25 |

FOREIGN PATENT DOCUMENTS

| | | |
|---|---|---|
| WO | WO 98/08344 | 2/1998 |
| WO | WO 98/13807 | 4/1998 |

OTHER PUBLICATIONS

Menezes, Alfred J.; van Oorschot, Paul C., Handbook of Applied Cryptography, CRC Press, Dec. 17, 1996; pp. 283–284.
Menezes et al, "Handbook of Applied Cryptography", 1996, pp. 283–284.*

* cited by examiner

Primary Examiner—Thomas R. Peeso
(74) Attorney, Agent, or Firm—Brian N. Young; Townsend and Townsend and Crew LLP (57) ABSTRACT

A delivery system for managing security keys uses three key pairs to establish, register, move and revoke rights in a device to view protected information. The first and second key pairs cooperate to establish a secure certificate containing a device public and private key, and the pairs of keys are manipulated to install the appropriate keys in the device and the associated authentication server without ever exposing the keys. Thereafter, in the event of a need to authorize a new device to view content associated with a prior, authorized device, the key pairs are used to revoke the rights of an old device and establish identical viewing rights in the new device.

5 Claims, 6 Drawing Sheets

Registration Process
FIG. 3

Authentication Detail

Movement Process
FIG. 5

Revocation Process
FIG. 6

CERTIFICATE HANDLING FOR DIGITAL RIGHTS MANAGEMENT SYSTEM

RELATED APPLICATION

This application is a continuation-in-part of U.S. patent application Ser. No. 09/034,720, filed Mar. 4, 1998, entitled Secure Content Distribution System, and incorporates by reference U.S. patent application Ser. No. 09/168,080 entitled Digital Rights Management System, filed on even date herewith and assigned to the same assignee as the present invention.

FIELD OF THE INVENTION

The present invention relates to generation, management and replacement of encryption keys, and more particularly relates to methods for generation, management and replacement of encryption keys in connection with the distribution and management of digital rights in encrypted text or other data.

BACKGROUND OF THE INVENTION

The ubiquitous nature of the Internet in the business community, and the increasing penetration of the Internet into homes, has generated a new era in the distribution of information to interested recipients. The ease with which volumes of information can be disseminated around the world over the Internet has been demonstrated and documented.

While this ease of distribution is valuable and desirable, in many instances, the information—whether text, data, code, graphics or some other form—is valuable and its owners prefer that this information not be distributed freely. In such circumstances, the need for a suitable form of protection for the information becomes critical. A conventional approach has been the use of encryption, typically using a combination of a public key and a private key. Such techniques are well known and offer significant security when used properly.

One difficulty with conventional applications of such techniques, however, is that the protected information is, at some point, decrypted for viewing or other use in an insecure environment. At that point, the information is able to be disseminated contrary to the wishes of the owner of the information—an undesirable result.

U.S. patent application Ser. No. 09/034,720 describes a secure reader for such information, typically though not necessarily for use with text, in which a unique private key is associated with each reader and a public key associated with that reader is available to the owner of the protected information. The owner of the information encrypts the information with the public key, and the information is thereafter downloaded to the associated reader. The reader then decrypts the information with the internally-maintained private key, allowing the user to view the decrypted information.

While this approach offers many advantages, it is important that the public and private security keys not be readily available together during the manufacturing process to avoid potential abuse such as theft or hacking. While there are numerous techniques for attempting to maintain security for encryption keys in a manufacturing environment, most currently available techniques involve both public and private keys (i.e., key pairs) being jointly available at some point during the manufacturing process. One approach is for a remote source (for example, the information owner) to generate the key pairs and to send the private keys to the factory during production. This has the obvious disadvantage that the private keys are, at some point, known to the factory.

Another approach is for the factory to be allowed to generate the key pairs, in which case the public keys will be provided to the owner of the information for use in subsequent downloads of protected information. This, too, suffers from the problem that the key pairs are both available at the factory, and therefore unacceptably subject to theft or other abuse.

Beyond just the manufacturing issues, additional issues exist with secure systems when the reader requires service, is lost, or is otherwise replaced. In most instances, the reader will include significant amounts of purchased content, such that the user will want to have transferred to the new reader all titles or other digital rights that existed in information maintained on the prior reader. With conventional techniques, this again requires that the key pair be available during the manufacturing process; this is, in general, an unacceptable security risk.

SUMMARY OF THE INVENTION

The present invention overcomes many of the limitations of the prior art and, more particularly, provides a secure system and method for generating and distributing encryption keys both during manufacturing and thereafter, and for transferring existing digital rights in data from a first device to a replacement or other device.

In particular, the system and method for generating key pairs during the manufacturing process makes it possible to generate the key pairs without both keys in the key pair existing in an insecure environment at any time. More specifically, the present invention permits distributed generation of the public and private keys, with the factory installing secure versions of the key pair in the reading device. The reading device, or reader, is then used to transport the public key in a secure way to an authentication server.

To implement the present invention, the factory public key must be registered with the authentication server, and the authentication server public key must be registered with the factory server or other equipment. The factory equipment automatically generates an encrypted form of the public/private key pair and further generates an appropriate, unique indicia indicative of the associated device. This indicia can also be read directly from the device if the device has an unique indicia built into the hardware, such as a "silicon serial number" available in many CPU and peripheral integrated circuits. The indicia and the new public key of the device is then encrypted with the public key of the authentication server, and appends to the indicia the authentication server public key. The indicia and appended public key are then hashed and signed with the factory private key to generate a device certificate, which is sent to the electronic reader.

The electronic reader receives the device certificate, authenticates it and, if authentic, compares a portion of the indicia to ensure the certificate is truly intended for the recipient reader. If so, the device private key is installed as well as the authentication server public key; the remainder of the indicia and the encrypted device public key are stored and the reader is ready to ship.

Once the reader is received by the user, the user registers the reader with an appropriate entity having certificate authority such as the authentication server. This is accomplished by the device uploading the encrypted indicia and encrypted device public key, either directly or through another computer connected to the Internet. Once uploaded, the authentication server decrypts the device public key and authenticates the package using the factory public key. If authentic, it registers the device public key in the database. Additional user-specific information is typically encoded by the authentication server to generate a user certificate, which is encrypted with the device public key and signed by the private key of the certificate authority. The User Certificate contains a different public/private key pair that will be used for decrypting content. The public key is registered in the authentication server database, and the private key is put into a secure archive. The sequence number of the certificate is set to a low number. The user certificate is then provided to and installed by the reader. The user certificate is then decrypted and authenticated with the device private key and the authentication server public key both installed at the factory, and the result of the authentication process is provided to the authentication server. If successful, the user certificate is now associated with the specific electronic reader and the process completes.

If at some later time the electronic reader needs to be serviced or replaced for any reason, the user initiates a certificate movement which causes the authentication server to start a revocation process. The revocation process generates a revocation certificate. The certificate is sent to the first device where it is decrypted and authenticated. The device responds back to the authentication server or other appropriate certificating authority with a revocation acknowledge, and the authentication server authenticates the response. If authenticated, the revocation is recorded as successful and the first reader is no longer authorized to view the protected information.

The authentication server or other certificating authority then generates a new user certificate using the old public and private keys This is done by looking up the user's public key in the key database, and retrieving the private key from the secure archive. It also looks up the sequence number of the user certificate and increases the value. The new sequence number is built into the customer certificate. The new user certificate is then sent to and installed by the second device, after which the second device sends a confirmation to the authentication server. This permits the user to continue to exercise all rights he had with the first unit, including reading, downloading or otherwise using the protected information in any permissible way.

The foregoing summary of the present invention may be better appreciated from the following Detailed Description of the Invention, taken together with the attached Figures.

DETAILED DESCRIPTION OF THE INVENTION

By way of example only, the invention described hereinafter may be used with the secure content distribution system shown and described in U.S. patent application Ser. No. 09/034,720, entitled Secure Content Distribution System, filed Mar. 4, 1998, and U.S. patent application Ser. No. 09/168,000, entitled Digital Rights Management System, filed on even date herewith both of which are assigned to the same assignee as the present application.

Figure 1:
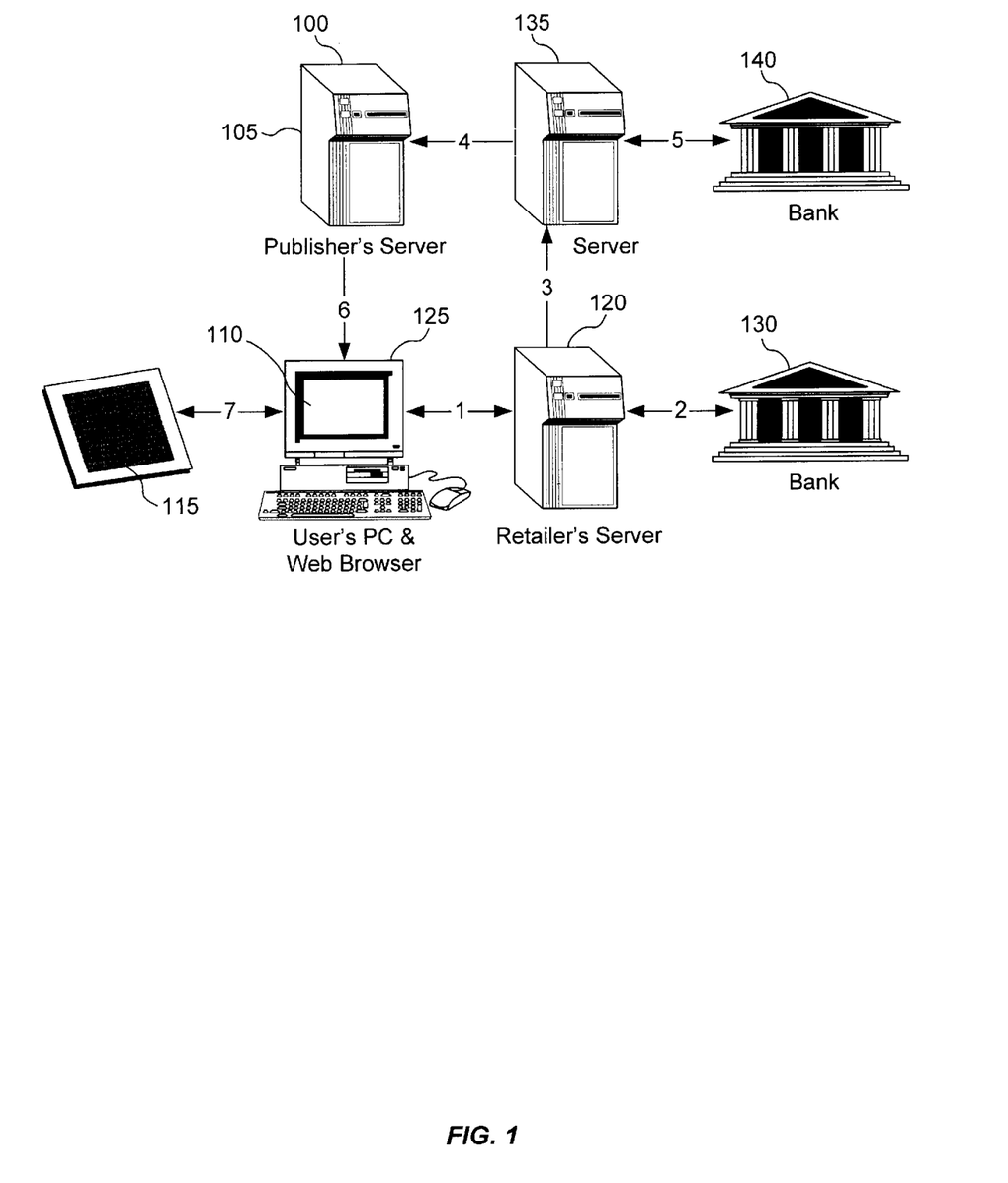
FIG. 1 shows generally a secure distribution system for management of digital rights in accordance with the present invention.

Referring first to FIG. 1, a distribution system 10 in accordance with the present invention can be better appreciated. A publisher server 100 contains thereon one or more files of protected information 105 such as the text of books, databases, code, graphics, or other information considered valuable by the owner. The files 105 are typically maintained in an unencrypted form on the publisher server 100, although in some embodiments the files of content may be maintained in encrypted form. In other embodiments the publisher server 100 may include an encryption process for securing content files before such files are transmitted in the manner described hereinafter. Although it is to be understood that the certificate process described herein may be used with virtually any type of information, for purposes of example and simplification in the aid of understanding, the present invention will be described in the context of a text distribution system.

A user PC 110, typically configured with Internet access and suitable front-end software 112 such as a Web browser (for example, NETSCAPE™ or MICROSOFT EXPLORER™, communicates with an electronic reader 115 as well as a retailer server 120. As described in greater detail hereinafter, the reader 115 is typically identified by a unique indicia such as a serial number 117 and in a typical embodiment also includes a private encryption key 119 which may be uniquely associated with either a specific reader or a specific customer. In addition to the browser 112, the user PC typically has installed application software such as a Java applet or a helper application 125 which cooperates with a browser by querying the reader 115 to extract the reader serial number or other customer ID 117. The PC 110 may be rendered unnecessary in some embodiments by including in the reader 115 browser software and the ability to access the Internet. Alternatively, for some types of protected information, the functionality of the reader may be incorporated into a secure portion of a more generic device such as a PC.

The customer then browses a retailer's server 120 (for example, Amazon.com) and identifies selected books or text that the user wishes to purchase in electronic form. Once the customer begins the purchase transaction for the identified books (which typically includes providing ISBN numbers or other sufficient information to uniquely identify the book), the applet or helper application 125 provides the customer or reader specific indicia 117 to the retailer's server. Alternatively, this information can be entered manually, or could be stored as a cookie or on the server 120. Still further, the helper application 125 could be implemented as a plug-in, although plug-ins tend to be browser-specific and more complicated as a result. Regardless of the specific implementation, the retailer's server 120 is supplied with customer-specific indicia which permits subsequent authentication of the purchase and verification of the purchaser. In some, though not all, the IP address of the user's PC may also be provided to the retailer server as part of the transaction. In addition, the user supplies appropriate payment information which may be, for example, a credit card number or other Internet-capable payment scheme.

The retailer server 120, which may be any form of Internet-connected server, responds to a purchase request from a user by executing payment with an associated financial institution 130 such as a bank or other credit clearing house. In addition, the ID of the reader and the indicia of the requested publication (e.g., ISBN number) is supplied to an authentication server 135. In a presently preferred embodiment, the authentication server 135 provides several key functions including maintenance of a database of the electronic IDs, or keys, of the various readers. Also, the server 135 maintains a database identifying the publisher for a given ISBN number, including country in which the customer's reader is located. In addition, the authentication server 135 authenticates requests from those readers by ensuring that the ID received as part of a particular transaction matches the user maintained in the database. Further, the authentication server maintains a database of all purchases and related accounting information for each of the readers. One advantage of such an arrangement is that, if a reader 115 fails or the content stored therein is erased, the database maintained by the server 135 can automatically arrange for replacement of the downloaded text in a manner described hereinafter. In addition, in at least some embodiments, the authentication server will execute a financial transaction with a bank 140 or other clearing house. The authentication server 135 typically passes to the publisher server 100 a confirmed request for a file 105 which represents the electronic version of the book requested by the user.

At this point the transaction is complete but for supplying the electronic file to the customer's reader. In some instances, the customer may not wish to immediately download the file; in others, the customer may want an immediate download. If no download is requested, the process essentially terminates until a download is requested. Once a download is requested—which may come hours, days, weeks or more later—the request is acknowledged by the publisher server 100. At that point, the publisher server downloads the encrypted file 105 to the user's PC 110, via the plug-in or helper application 125; a web browser may also be used in at least some embodiments. The encryption is typically customized for the electronic ID of the particular reader 115, typically using the key or ID uniquely associated with that reader, so that the encrypted file can only be displayed as clear text on the requesting reader 115. In addition, in a currently preferred embodiment, the user's PC is not capable of decrypting the file, so that no clear text version of the book exists anywhere but the publisher's server. In this manner, copyright violations are avoided and the rights of the publisher are protected. In some instances, such as for works in the public domain, it may be desirable not to use encryption, in which case the encryption/decryption steps are simply eliminated.

With the aid of the helper application 125, the user's PC stores the encrypted file 105 until the associated reader 115 establishes a communications link through any suitable protocol, including serial, parallel, USB, twisted pair, or infrared. The file is then downloaded to the reader 115, where appropriate decryption occurs and permits the file to be displayed as clear text.

In an important feature, the distribution scheme of the present invention never requires that the content represented by the file 105 be licensed to any intermediate holder; that is, neither the retailer server nor the authentication server need have any control over or custody of the content, which passes solely between the publisher server 100 (or the server of any other information owner) and the user PC 110. In a presently preferred embodiment, the file 105 is maintained in encrypted form, although such encryption may not be required for all files 105. Nevertheless, for those files that are encrypted, the publisher or other copyright holder can be assured that unauthorized copies will not exist. In some embodiments, it may also be desirable to configure the reader 115 to decrypt only a page of text currently being displayed, so that the remaining text is maintained in fully encrypted form even within the reader 115.

Figure 2:
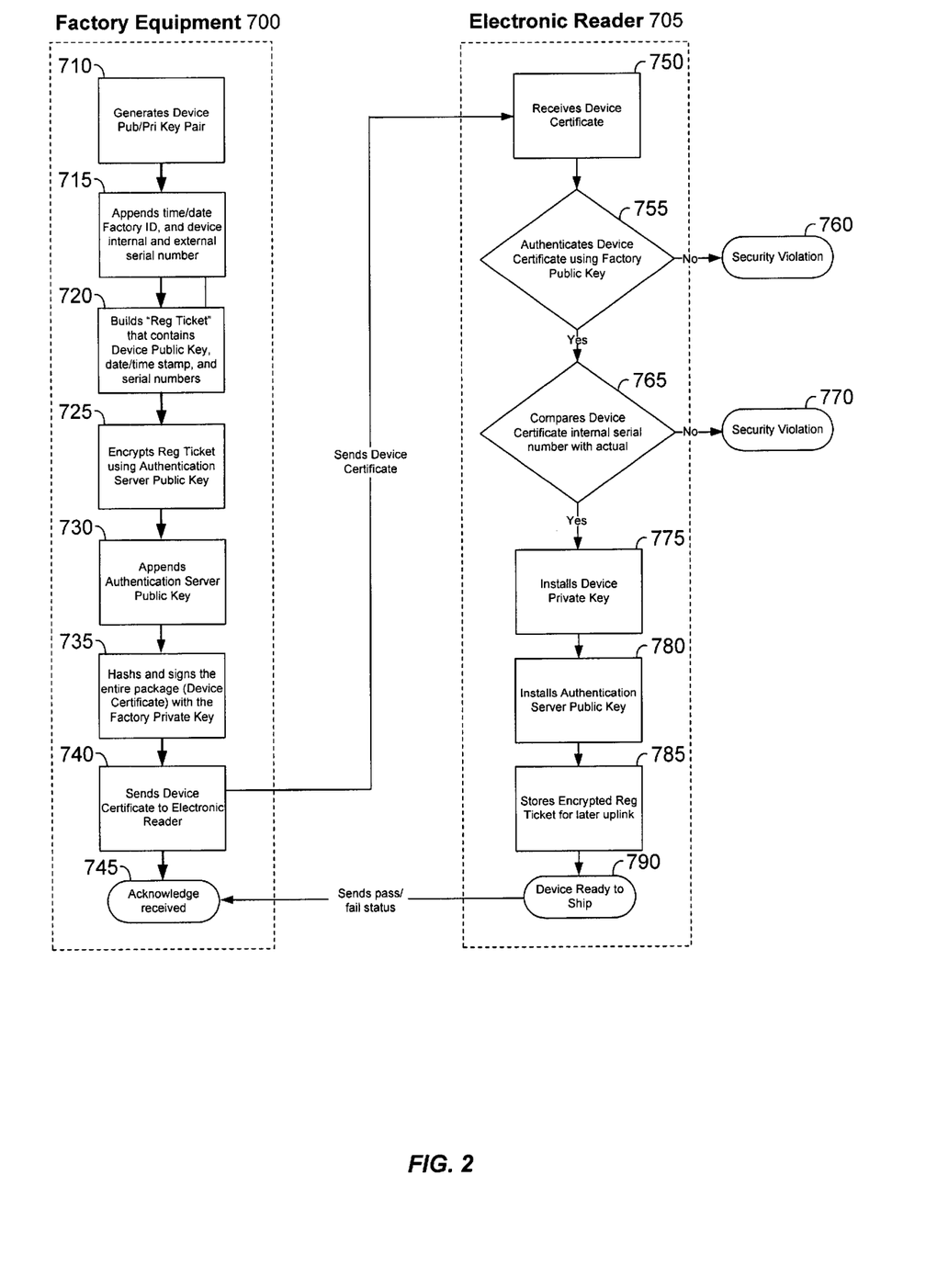
FIG. 2 shows in flow diagram form an exemplary implementation of a secure key pair generation and installation system and method in accordance with the present invention.

Referring next to FIG. 2, an exemplary system and method for secure generation and installation of a key pair is shown in flow diagram form. The "factory equipment" portion 700 shown in dotted lines at the left of the diagram represents the functions performed by the manufacturing equipment; the "electronic reader" portion 705 shown at the right in FIG. 2 is performed at the reader level.

The process of FIG. 2 begins at step 710 with the generation of a public/private key pair for the specific device, or reader 115. The process then advances to step 715 where the time/date, factory ID, and device external and internal serial numbers are appended to the key pair. At step 720, a "Reg Ticket" is built that includes the Device Public Key, the date/time stamp, and the aforementioned serial numbers. That "Reg Ticket" is then encrypted at step 725, using the Authentication Server Public Key. The "Reg Ticket" is then amended at step 730 by appending to it the Authentication Server Public Key. At step 735, the amended Reg Ticket is then hashed and signed with the Factory Private Key to form a Device Certificate. The Device Certificate is then sent, at step 740, to the "electronic reader" portion 705, which in part of the reader 115 and the process advances to step 745 to await a response from the reader.

When the electronic reader 115 receives the Device Certificate at step 750, it authenticates the Device Certificate using the Factory Public Key at step 755. If the authentication fails, a security violation message is set at step 760 and the process halts. However, if the authentication succeeds, the actual serial number is compared with the Device Certificate internal serial number at step 765. If the authentication fails, an error is set at 770 and the process halts. If, as will more often be the case, the authentication succeeds, the reader installs the device private key at step 775. The reader thereafter installs the authentication server public key at step 780, and at 785 stores the encrypted Reg Ticket for later uplink to an authentication server, after which the device is deemed ready to ship at step 790. At that point the process sends a pass/fail status message back to the factory equipment, and the processes complete.

Thereafter, the reader 115 is provided to a user, and the user will at some point desire to acquire protected information viewable on the reader. At that point the user connects to the distribution system described in U.S. patent application Ser. No. 09/034,720 filed Mar. 4, 1998, incorporated herein by reference, via the Internet or other appropriate connection, and initiates a registration process on the first use. Thus, with reference to FIG. 3, the initiation of the registration process by the user is shown at step 800. The process is then carried forward in the electronic reader 115 and the authentication server, with each portion shown in FIG. 3 respectively in dashed boxes 705 and 805.

Figure 3:
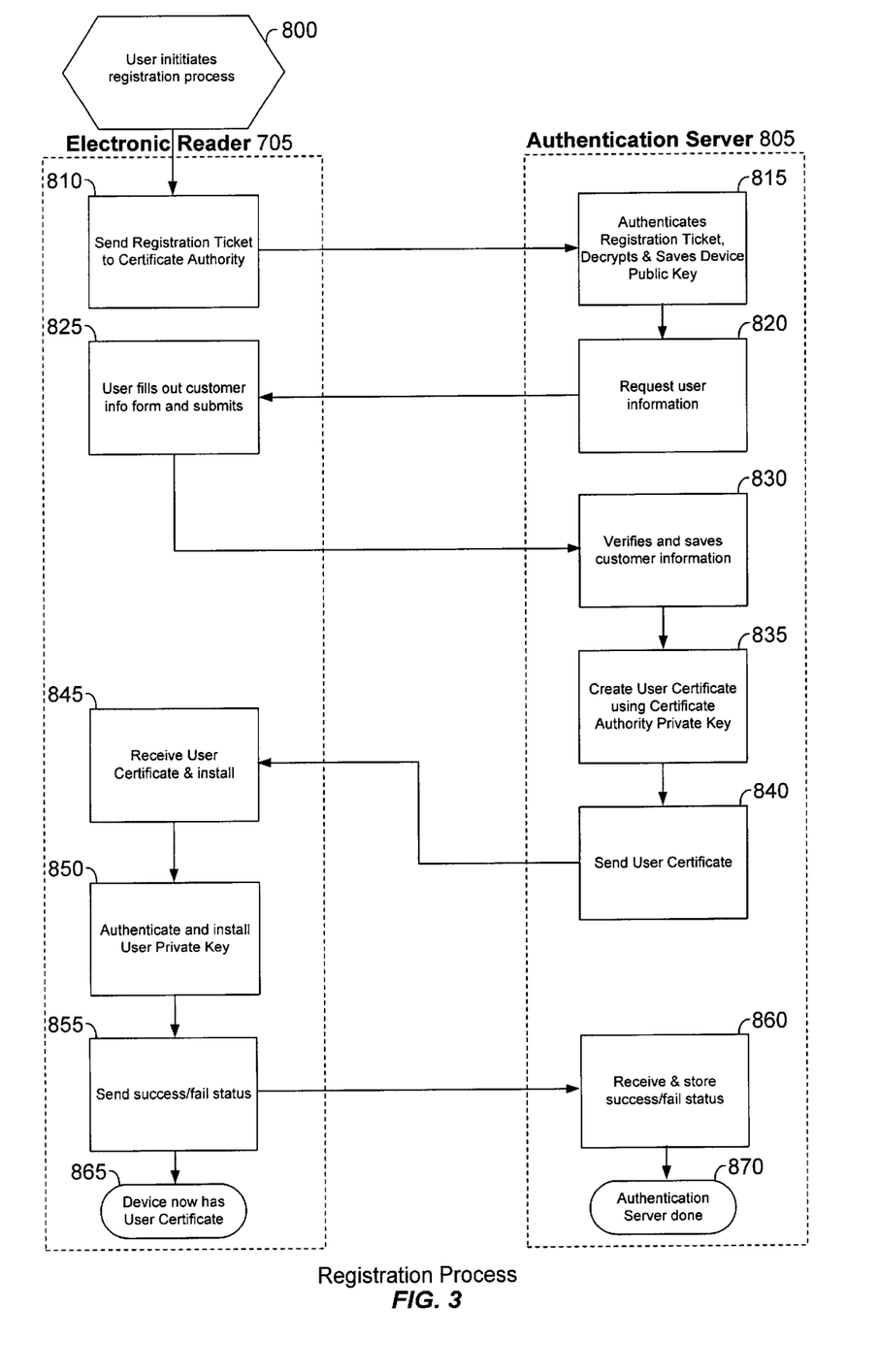
FIG. 3 shows in flow diagram form the registration of an electronic reader and the certificate generation associated therewith.

The process advances in the electronic reader portion 705 by the reader sending its Reg Ticket to an associated Certificate Authority at step 810. The Certificate Authority may, in an exemplary embodiment, be the authentication server 135, although it could be implemented in any convenient way. For purposes of clarity, the certificate authority in this case will be assumed to be the authentication server 135. Upon receipt of the Reg Ticket from the reader in step 810, at step 815 the authentication server authenticates the Reg Ticket, decrypts it using the authentication server private key and saves the Device Public Key. The authentication server then, at step 820, sends to the reader a request for such user-specific information as specified by the certificate authority or other appropriate authority. This data can be entered directly with the authentication server over a Web interface. The reader replies (or the Web form is submitted) at step 825 once the user inputs the necessary data, after which the authentication server 805 verifies and saves the customer information at step 830. At this point, step 835, the authentication server creates a new public/private key pair for the User Certificate. The Public key is recorded in the Authentication Server database, and the private key is moved to a secure archive. The User Certificate contains information about the user, the private user key, and sequence number for this user. The Certificate is then encrypted using the Device Public Key and signed using the Certificate Authority Private Key. The User Certificate is then sent to the reader at step 840.

Once the reader receives the User Certificate at step 845, it is installed in the reader and the process advances to step 850 where the User Private Key is then decrypted, authenticated and installed. Whether the authentication and installation step is successful or not, the process advances to step 855 where the results are reported to the authentication server at step 860. The server receives and stores the success/fail status, and the process completes at steps 865 and 870, respectively, with the reader having an installed User Certificate and the authentication server portion of the process being done.

Figure 4A:
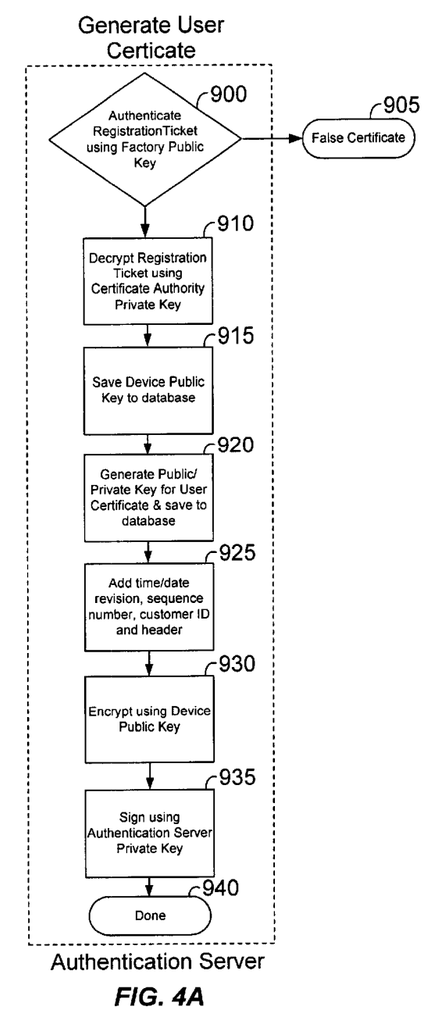
FIGS. 4A–4B shows in flow diagram form an implementation of the steps for generating and authenticating a user certificate as part of the registration process of FIG. 3.
Figure 4B:
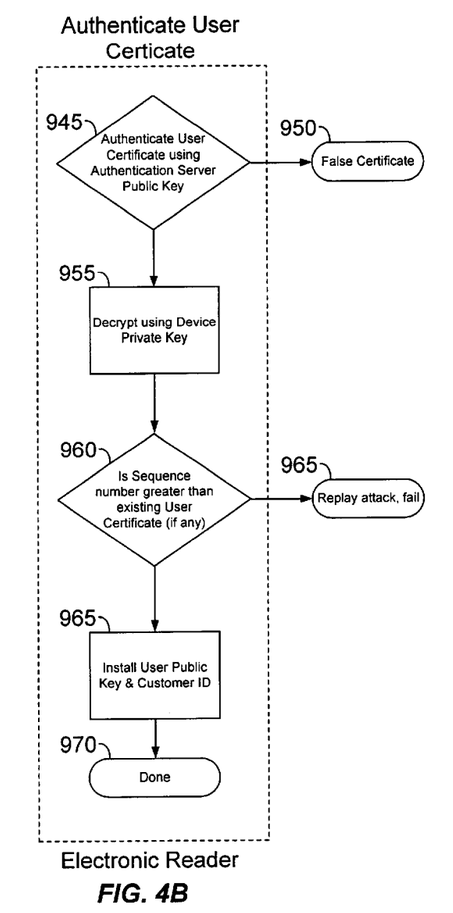

Referring next to FIGS. 4A–4B, the authentication steps in the registration process of FIG. 3 may be better appreciated. In particular, FIG. 4A, which occurs in the authentication server, shows the process of generating a User Certificate, while FIG. 4B, which occurs in the electronic reader, shows the process of authenticating the User Certificate received from the authentication server. The User Certificate is generated by, at step 900, authenticating the Reg Ticket using the Factory Public Key. If the authentication is not successful, the process halts at step 905. However, in the more common instance of the authentication succeeding, at step 910 the Reg Ticket is decrypted using the Certificate Authority Private Key. This provides the Device Public Key, which is saved to a database at step 915.

At step 920, the Public/Private Keys are generated for the User Certificate, and saved to a database. The User Certificate is then amended at step 925 by adding the time and date revision, a sequence number, a customer ID and a header. The resultant User Certificate is then encrypted at step 930 using the Device Public Key, with the encrypted result being signed by using the Authentication Server Private Key at step 935. The User Certificate is then ready for sending to the reader, so the process completes at step 940.

On the reader side, shown in FIG. 4B, step 850 (FIG. 3) of authenticating and installing the User Certificate begins at step 945 with the authentication of the User Certificate using the Authentication Server Public Key. If authentication fails, the process halts at step 950; but if successful, the process advances to step 955 and the User Certificate is decrypted using the Device Private Key. At step 960 a check is performed to determine whether the sequence number portion of the user certificate is greater than an existing user certificate (if any—in new registrations there will not be an existing certificate). If the sequence number is not greater, the process fails at step 965.

In most instances, as discussed hereinafter in connection with FIGS. 5 and 6, the sequence number will be greater and the process will advance to step 965. At that step the reader install the User Public Key and Customer information, uniquely associating that reader with a particular user. The process then completes at step 970.

At this point, the user is free to acquire protected information and view it in any permissible manner, all as described in U.S. patent application Ser. No. 09/034,720, discussed above. However, at future time a user may lose a reader or simply desire to upgrade to a newer model. At that time, the typical user is likely to have a substantial investment in the digital rights to the protected information, and is unlikely to want to incur any significant costs in having to reacquire those rights. At the same time, the owner of the protected information needs assurances that the rights will not be abused, while the operator of the authentication server needs a simple method by which rights can be appropriately transferred to a new reader.

Figure 5:
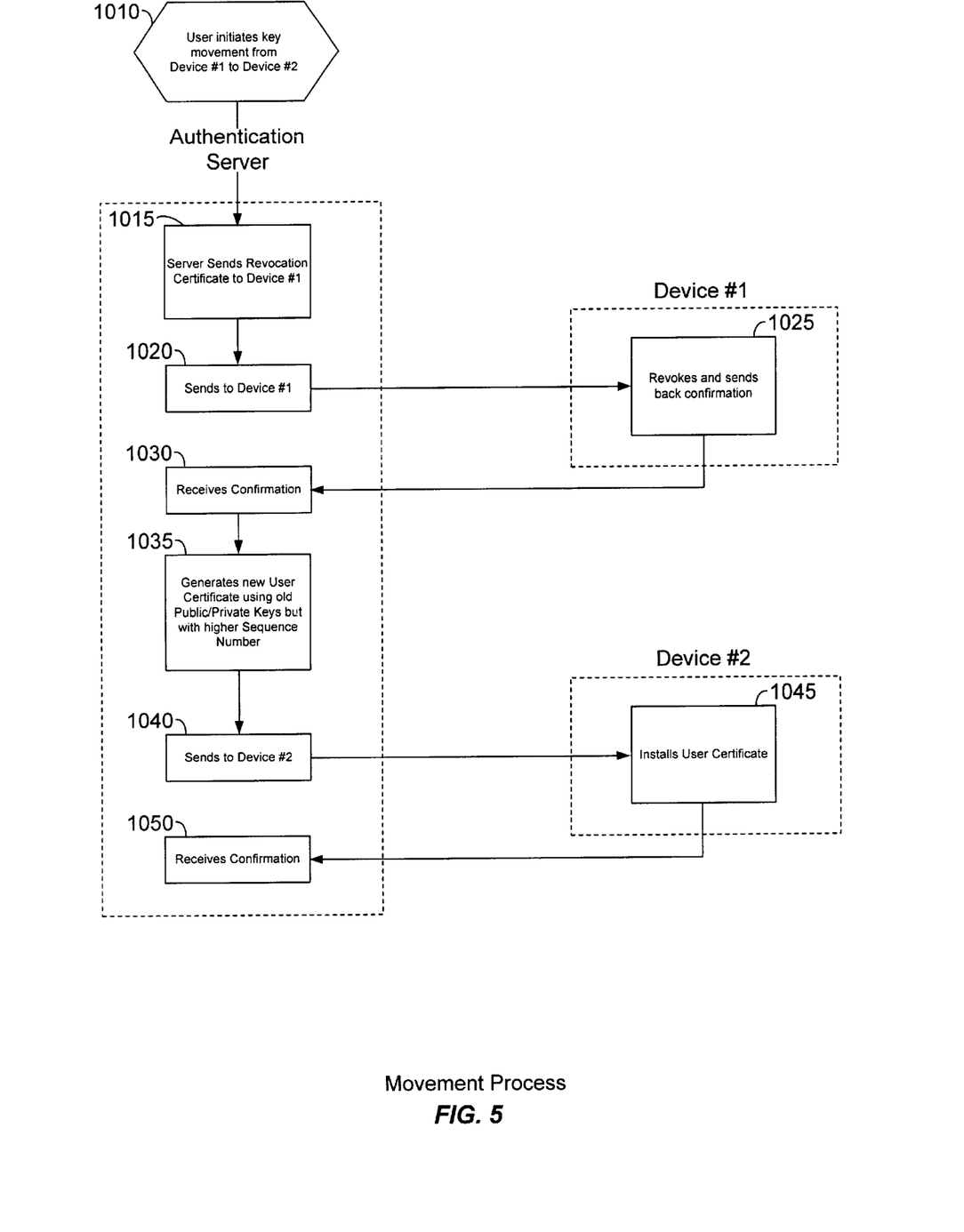
FIG. 5 shows in flow diagram form the movement of a user certificate and associated key pair from a first user device to a second user device.
Figure 6:
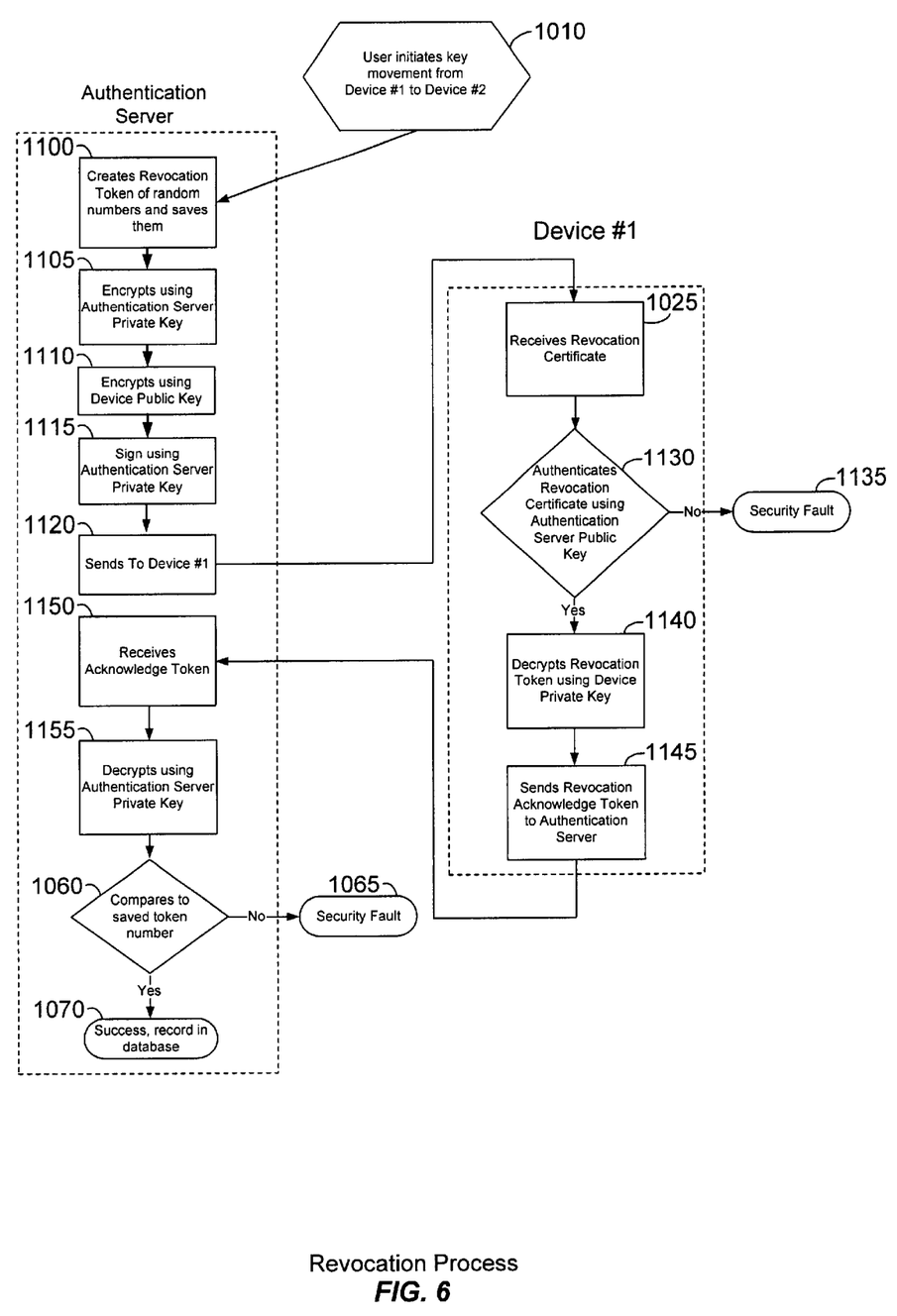
FIG. 6 shows in flow diagram form the details of the revocation process included in the overall process of FIG. 5.

These concerns are met by the certificate move process shown in FIGS. 5 and 6, which provide for movement of a certificate and the associated keys from a first device to a second device. In a typical scenario, the user receives a second device and desires to transfer his rights from the first device to the second device, and initiates the process by linking to the distribution system and more particularly to the authentication server, as shown at step 1010 of FIG. 5. The authentication server responds at step 1015 by developing a revocation certificate to be sent to the first reader, which is then sent at step 1020. The first device, if available, responds at step 1025 by revoking that reader's User Certificate, and sends back confirmation to the authentication server. In the event the first reader is lost or stolen, and therefore unavailable, the step 1025 may be held for later implementation in the event the reader does attempt to make contact at some point. For purposes of clarity, however, it will be assumed in this example that both devices are available.

At step 1030, the authentication server receives confirmation of the revocation which occurred at step 1025, and at step 1035 the authentication server generates a new User Certificate with the old public and private keys, but with a higher sequence number. The process then advances to step 1040 where the new User Certificate is sent to the second device/reader. The new certificate is then installed in the second device at step 1045 and confirmation is returned to the server. The server receives the confirmation at step 1050, and completes with the second device being fully authorized to view any of the titles or other information acquired by the user of the first device. Simply put, the User certificate and associated public and private keys has been moved from the first device to the second device.

Referring next to FIG. 6, however, details of steps 1015 through 1030 shown generally in FIG. 5—the revocation steps—may be better appreciated. As shown generally in FIG. 5, the subprocess begins with the user initiating key movement from the first to the second device at step 1010. This causes, at step 1110, the authentication server to create and save a Revocation Token of random numbers. Although random numbers are generally preferred for security reasons, non-random numbers or other indicia may be acceptable in some embodiments. The Revocation Token is then encrypted at step 1105 using the Authentication Server Private Key, after which the result is encrypted using the Device Public Key at step 1110. The double encrypted result is then signed at step 1115 with the Authentication Server Private Key and sent (at step 1120) to the first device as a Revocation Certificate.

The first device, assuming it is available, receives the Revocation Certificate at step 1125, which it attempts to authenticate at step 1130. If the authentication fails, the process halts at step 1135. However, if successful, the process advances to step 1140 where the Revocation Token is decrypted from the Revocation Certificate using the Device Private Key. A revocation acknowledge token is then sent to the Authentication Server at step 1145.

The authentication server receives the acknowledge token and decrypts it using the Authentication Server Private Key, and compares the result to the saved to the authentication server. In the event the first reader is lost or stolen, and therefore unavailable, the step 1025 may be held for later implementation in the event the reader does attempt to make contact at some point. For purposes of clarity, however, it will be assumed in this example that both devices are available.

At step 1030, the authentication server receives confirmation of the revocation which occurred at step 1025, and at step 1035 the authentication server generates a new User Certificate with the old public and private keys, but with a higher sequence number. The process then advances to step 1040 where the new User Certificate is sent to the second device/reader. The new certificate is then installed in the second device at step 1045 and confirmation is returned to the server. The server receives the confirmation at step 1050, and completes with the second device being fully authorized to view any of the titles or other information acquired by the user of the first device. Simply put, the User certificate and associated public and private keys has been moved from the first device to the second device.

Referring next to FIG. 6, however, details of steps 1015 through 1030 shown generally in FIG. 5—the revocation steps—may be better appreciated. As shown generally in FIG. 5, the subprocess begins with the user initiating key movement from the first to the second device at step 1010. This causes, at step 1110, the authentication server to create and save a Revocation Token of random numbers. Although random numbers are generally preferred for security reasons, non-random numbers or other indicia may be acceptable in some embodiments. The Revocation Token is then encrypted at step 1105 using the Authentication Server Private Key, after which the result is encrypted using the Device Public Key at step 1110. The double encrypted result is then signed at step 1115 with the Authentication Server Private Key and sent (at step 1120) to the first device as a Revocation Certificate.

The first device, assuming it is available, receives the Revocation Certificate at step 1125, which it attempts to authenticate at step 1130. If the authentication fails, the process halts at step 1135. However, if successful, the process advances to step 1140 where the Revocation Token is decrypted from the Revocation Certificate using the Device Private Key. A revocation acknowledge token is then sent to the Authentication Server at step 1145.

The authentication server receives the acknowledge token and decrypts it using the Authentication Server Private Key, and compares the result to the saved token number at step 1160. If the token does not match, the process halts at step 1165; but if a match exists, the revocation is deemed a success and is recorded in a database. At that point the step can advance to generating a new user certificate, as shown at step 1035 in FIG. 5.

It can thus be appreciated that an effective method for secure generation of public and private keys has been shown, together with a method for transferring those keys and the associated rights. Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A method for secure distribution of a public and private key pair during an initial installation process, comprising establishing a first key pair comprising public and private keys, associating the first key pair with a first process portion, establishing a second key pair comprising public and private keys, associating the second key pair with a second process portion, registering the public key of the first key pair with the second process portion, registering the public key of the second key pair with the first process portion, generating a third key pair comprising public and private keys, the third key pair associated with a device for reviewing protected information, generating a first certificate based at least in part on the public key of the third key pair and encrypted with at least the public key of the second key pair and the private key of the first key pair providing the first certificate to the device during the initial installation process.

2. A method for secure distribution of a public and private key pair during an initial installation process, comprising establishing a first key pair comprising public and private keys, associating the first key pair with a first process portion, establishing a second key pair comprising public and private keys, associating the second key pair with a second process portion, registering the public key of the first key pair with the second process portion, registering the public key of the second key pair with the first process portion, generating a third key pair comprising public and private keys, the, third key pair associated with a device for reviewing protected information, generating a first certificate based on indicia including the public key of the third key pair and encrypted with at least the public key of the second key pair and the private key of the first key pair providing the first certificate to the device, decrypting, in the device, the first certificate using the public key of the first key pair, confirming that the indicia is correct, installing the private key of the third key pair in the device, and installing the public key of the second key pair in the device during the initial installation process.

3. A method for transferring a secure key from a first device to a second device comprising sending a revocation certificate to the first device, receiving a confirmation of revocation back from the first device, identifying a pair of pre-existing public and private security keys for the first device, identifying a pre-existing user certificate sequence number for the first device; and generating a user certificate based on the pair of pre-existing public and private keys with a higher sequence number than the pre-existing sequence number.

4. A method for revoking rights in a device to view protected content comprising generating in a first server a first indicia, creating a first message by encrypting the first indicia using a private key associated with the first server, creating a second message by encrypting the first message with a public key associated with the device, creating a revocation certificate by signing the second message with the private key associated with the first server, transmitting the revocation certificate to the device, authenticating, in the device, the revocation certificate, in response to a successful authentication, revoking the rights in the device;

replying from the device to the first server with a revocation acknowledge token, authenticating the revocation acknowledge token in the first server.

5. A method for secure distribution of a public and private key pair comprising establishing a first key pair comprising public and private keys, associating the first key pair with a first process portion, establishing a second key pair comprising public and private keys, associating the second key pair with a second process portion, registering the public key of the first key pair with the second process portion, registering the public key of the second key pair with the first process portion, generating a third key pair comprising public and private keys, the third key pair associated with a device for reviewing protected information, generating a first certificate based at least in part on the public key of the third key pair and encrypted with at least the public key of the second key pair and the private key of the first key pair providing the first certificate to the device;

receiving the first certificate;

generating a fourth key pair comprising public and private keys, the fourth key pair associated with a user of the device;

generating a second certificate based at least in part on the private key of the fourth key pair and encrypted with at least the public key of the third key pair and the private key of the second key pair;

providing the second certificate to the device.

* * * * *